United States Patent
Yang et al.

(10) Patent No.: US 10,754,191 B2
(45) Date of Patent: Aug. 25, 2020

(54) DISPLAY LIGHT SOURCE MODULE HAVING ENCAPSULATED LEDS AND REFLECTIVE RECESS WITH REFLECTIVE PATTERNS

(71) Applicant: Coretronic Corporation, Hsin-Chu (TW)

(72) Inventors: Wen-Hsun Yang, Hsin-Chu (TW); Yu-An Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/590,393

(22) Filed: Oct. 2, 2019

(65) Prior Publication Data
US 2020/0117051 A1    Apr. 16, 2020

(30) Foreign Application Priority Data
Oct. 10, 2018    (CN) .......................... 2018 1 1177121

(51) Int. Cl.
*G02F 1/1335*    (2006.01)
*G02F 1/13357*    (2006.01)

(52) U.S. Cl.
CPC .. *G02F 1/133605* (2013.01); *G02F 1/133603* (2013.01); *G02F 1/133611* (2013.01); *G02F 2001/133607* (2013.01); *G02F 2001/133614* (2013.01)

(58) Field of Classification Search
CPC .......... F21V 5/004; F21V 5/005; F21V 5/002; F21Y 2105/10; F21Y 2115/10; G09F 13/0409
See application file for complete search history.

(56) References Cited

U.S. PATENT DOCUMENTS

| | | | | |
|---|---|---|---|---|
| 7,222,993 B2* | 5/2007 | Kikuchi | ................... | H01L 33/60 257/E33.072 |
| 7,385,653 B2* | 6/2008 | Kim | ....................... | H01L 33/54 257/E25.02 |
| 7,710,016 B2* | 5/2010 | Miki | ..................... | H01L 33/505 257/98 |
| 7,726,828 B2* | 6/2010 | Sato | ..................... | G02B 6/0043 362/341 |
| 7,762,705 B2* | 7/2010 | Sakai | ................... | G02B 6/0021 362/307 |
| 7,909,476 B2* | 3/2011 | Wang | ....................... | F21K 9/00 362/84 |

(Continued)

FOREIGN PATENT DOCUMENTS

| | | |
|---|---|---|
| TW | 200627671 A | 8/2006 |
| TW | M393643 U1 | 12/2010 |

(Continued)

*Primary Examiner* — Ismael Negron

(57) ABSTRACT

A light source module includes a plurality of light emitting dies provided on a bearing surface of a substrate, an encapsulation layer covering the bearing surface and the light emitting dies, a plurality of reflecting recesses respectively formed opposite the plurality of light emitting dies on a light exit surface of the encapsulation layer and having a surrounding surface inclined relative to the light exit surface, and a plurality of reflection patterns respectively disposed in the plurality of reflecting recesses. A display panel might be coupled to the light emitting surface.

21 Claims, 6 Drawing Sheets

(56) References Cited

U.S. PATENT DOCUMENTS

| | | | | |
|---|---|---|---|---|
| 7,997,771 | B2* | 8/2011 | Epstein | G02B 3/0056 |
| | | | | 362/339 |
| 8,408,738 | B2* | 4/2013 | Kim | G02B 6/0021 |
| | | | | 257/100 |
| 8,507,926 | B2* | 8/2013 | Weng | G02F 1/133603 |
| | | | | 257/88 |
| 9,140,929 | B2* | 9/2015 | Bae | G02F 1/133603 |
| 9,411,088 | B2* | 8/2016 | Krijn | G02B 6/0021 |
| 2007/0019394 | A1* | 1/2007 | Park | G02B 6/0018 |
| | | | | 362/23.18 |
| 2007/0103939 | A1* | 5/2007 | Huang | G02B 6/0078 |
| | | | | 362/633 |
| 2010/0244058 | A1 | 9/2010 | Weng et al. | |
| 2011/0050556 | A1 | 3/2011 | Bae et al. | |
| 2019/0324184 | A1 | 10/2019 | Cai et al. | |

FOREIGN PATENT DOCUMENTS

| | | |
|---|---|---|
| TW | 201122583 A1 | 7/2011 |
| TW | 201506508 A | 2/2015 |
| TW | M523875 U | 6/2016 |
| TW | I578068 B | 4/2017 |

\* cited by examiner

|  | Comparison 1 | Comparison 2 |
|---|---|---|
| Prior art | | |
| Present invention | | |

FIG. 3 replacement sheet

DISPLAY LIGHT SOURCE MODULE HAVING ENCAPSULATED LEDS AND REFLECTIVE RECESS WITH REFLECTIVE PATTERNS

CROSS-REFERENCE TO RELATED APPLICATION

This application claims the priority benefit of China application CN201811177121.8, filed on 2018 Oct. 10. The entirety of the above-mentioned patent application is hereby incorporated by reference herein and made a part of this specification.

FIELD OF THE INVENTION

The invention relates to a light source module and a display device, and more particularly to a direct type light source module and a display device with the direct type light source module.

BACKGROUND OF THE INVENTION

A liquid crystal display mainly includes components such as a backlight module, a display panel, and an outer frame. According to the direction of a light source, a backlight module can be further divided into an edge type backlight module and a direct type backlight module. Currently, a medium-sized and large-sized liquid crystal display using a light-emitting diode (LED) as a backlight module light source has a direct type backlight module with local dimming function in order to display high dynamic range (HDR) and high contrast requirements. A characteristic of the light-emitting diode is that it has strong positive light. Therefore, a structure design of the direct type backlight module is to convert a light of the light-emitting diode into a uniform surface light source and then illuminate a display panel.

A backlight module of a liquid crystal display has a backlight chamber. A plurality of light emitting diodes may be located at the bottom of the backlight chamber, and a diffusion plate may be disposed above the backlight chamber. When a thickness of the backlight chamber is sufficient, a light of the light-emitting diodes can be sufficiently diffused in the backlight chamber to obtain a uniform surface light source. However, if the thickness of the backlight chamber is reduced in order to reduce overall backlight module thickness, more light-emitting diodes must be disposed at the bottom of the backlight chamber to reduce spacing between the light-emitting diodes and to improve the uniformity of the surface light source, but it also caused an increase in cost.

In addition to deposing more light-emitting diodes in a backlight chamber, another way to reduce a thickness of a backlight chamber and maintain or even increase the uniform light diffusion effect is to diffuse a light from the light-emitting diode in the backlight chamber first. However, since the light-emitting diode has a strong positive light, even if a divergence angle of the light of the light-emitting diode is diffused by optical lens, a bright spot is still found above the light-emitting diode during an actual measurement. In addition, the light of the light-emitting diode has a limited diffusion distance in the backlight chamber, thus limiting a thickness of the backlight chamber that can be reduced.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a light source module that can provide a uniform surface light source while effectively reducing the thickness of the backlight.

The invention also provides a display device having a light source module of a lower thickness and capable of providing a uniform surface light source.

Other advantages and objects of the invention may be further illustrated by the technical features broadly embodied and described as follows.

In order to achieve one or a portion of or all of the objects or other objects, a light source module provided in an embodiment of the invention includes a substrate, a plurality of light emitting dies, an encapsulation layer, and a plurality of reflection patterns. The substrate has a bearing surface, the plurality of light emitting dies are disposed on the bearing surface of the substrate, and the encapsulation layer covers the bearing surface and the plurality of light emitting dies. The encapsulation layer has a light exit surface away from the bearing surface, and the light exit surface has a plurality of reflecting recesses, the plurality of reflecting recesses are respectively disposed opposite to the plurality of light emitting dies, and the reflecting recess includes a surrounding side surface inclined relative to the light exit surface. The plurality of reflection patterns are respectively disposed in the plurality of reflecting recesses.

In order to achieve one or a portion of or all of the objects or other objects, a display device provided in an embodiment of the invention includes a light source module and a display panel that is disposed relative to the light source module.

In the light source module and the display device of the invention, the light exit surface of the encapsulation layer has a plurality of reflecting recesses and a plurality of reflection patterns respectively disposed in the plurality of reflecting recesses. The light having a smaller angle (Light with a small angle between the light and the normal of the bearing surface) emitted by the light emitting die disposed relative to the reflecting recess can be reflected by the reflection pattern in the reflecting recess to avoid the problem of bright spot being detected above the light emitting die even if the optical lens is disposed on the light emitting die as is known in the art.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a simulation comparison diagram of the light emitting effects of a light source module of the invention and a light source module of the prior art;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
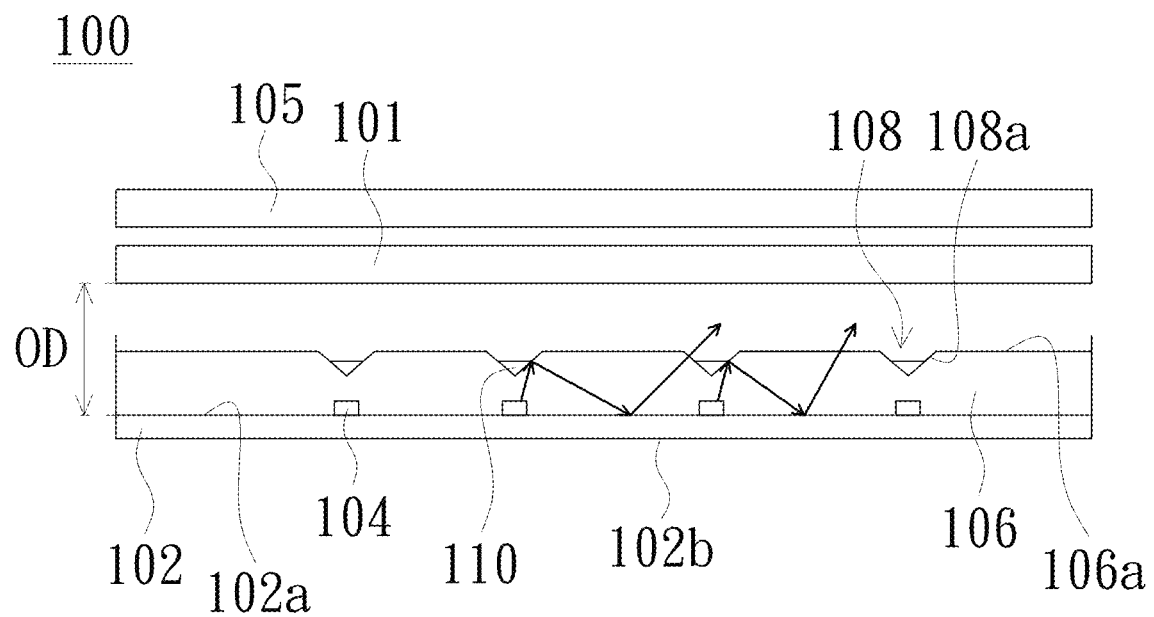
FIG. 1 is a schematic cross-sectional view of a light source module of one embodiment of the invention.

FIG. 1 is a schematic cross-sectional view of a light source module of one embodiment of the invention. Referring to FIG. 1, the light source module 100 of the embodiment includes a substrate 102, a plurality of light emitting dies 104, an encapsulation layer 106, and a plurality of reflection patterns 110. The substrate 102 has a bearing surface 102a, and the plurality of light emitting dies 104 are disposed on the bearing surface 102a of the substrate 102. The encapsulation layer 106 covers the bearing surface 102a and the plurality of light emitting dies 104. The encapsulation layer 106 has a light exit surface 106a away from the bearing surface 102a. The light exit surface 106a has a plurality of reflecting recesses 108 respectively disposed opposite to the plurality of light emitting dies 104, and the plurality of reflecting recesses 108 respectively include a surrounding side surface 108a inclined relative to the light exit surface 106a. The plurality of reflection patterns 110 are respectively disposed in the plurality of reflecting recesses 108 to reflect light emitted by the plurality of light emitting dies 104 with a small angle between the light and the normal of the bearing surface 102a.

In the embodiment, the substrate 102 can be a circuit board, the bearing surface 102a can be a reflective surface, and a portion region thereof is provided with a plurality of conductive patterns (not shown) to electrically connect the plurality of light emitting dies 104. A white lacquer reflective sheet or coating having diffuse reflection properties or a silver lacquer reflective sheet or coating having specular reflection properties may be disposed on the bearing surface 102a to configure the bearing surface 102a as a reflecting surface. In one embodiment, the substrate 102 may include a transparent plate having the bearing surface 102a and a bottom reflective layer (not shown) disposed on the base bottom surface 102b of the transparent plate opposite to the bearing surface 102a. Similarly, a plurality of conductive patterns are disposed in partial region of the bearing surface 102a to electrically connect the plurality of light emitting dies 104. The material of the transparent plate may include glass or plasticized material. The bottom reflective layer can be configured as a white lacquer reflective sheet or coating having diffuse reflection properties, or a silver lacquer reflective sheet or coating having specular reflection properties.

In the embodiment, the light emitting die 104 can be a die that is cut directly from a wafer and is unpackaged. The light emitting die 104 can be a light emitting diode die, specifically, a die level nitride light emitting diode die that emits blue light at a dominant wavelength for example. The plurality of light emitting dies 104 can be arranged in an array on the bearing surface 102. The light source module 100 of the embodiment may be a direct type light source module, and the main light emitting surface of each of the light emitting dies 104 faces the light exit surface 106a and is away from the bearing surface 102a.

In the embodiment, the material of the encapsulation layer 106 may be a silicone encapsulation resin having a refractive index of 1.41, but the material of the encapsulation layer 106 may also be an epoxy resin, a UV curable resin, or other encapsulating material that can be used to encapsulate the light emitting die 104. The region of the light exit surface 106a of the encapsulation layer 106 provided with no reflecting recess 108 may be provided with a plurality of concave portions and/or a plurality of convex portions (not shown), or is, for example, sandblasted or etched into a roughened surface (not shown), so that the light emitted by the light emitting die 104 can be diffused more uniformly when emitted from the light exit surface 106a.

In the embodiment, the light source module 100 may further include a diffusion plate 101. The diffusion plate 101 is disposed above the encapsulation layer 106 at an interval, and the distance between the diffusion plate 101 and the bearing surface 102a can be defined as an optical distance (OD). A wavelength conversion film 105 may be disposed on the diffusion plate 101 or between the diffusion plate 101 and the encapsulation layer 106, so that the diffusion plate 101 and the wavelength conversion film 105 can be included in an optical structure in the form of a laminated structure. In another embodiment, an optical plate may also contain diffusing particles and wavelength converting particles to have functions of light diffusion and wavelength conversion. The wavelength conversion film 105 may include a wavelength conversion material such as a quantum dot or a phosphor powder to perform wavelength conversion on a portion of light emitted from the light emitting die 104. For example, when the light emitting die 104 is a light emitting diode die whose dominant wavelength emits blue light, the wavelength conversion film 105 can convert part of the blue light into a yellow light after being excited, and the yellow light is mixed with the blue light to form a white light. However, the wavelength conversion film 105 may also contain different wavelength conversion materials as needed to convert the light of the light emitting die 104 into a light of one or more colors. The optical structure may further include other optical films, such as brightness enhancement film.

Figure 2A:
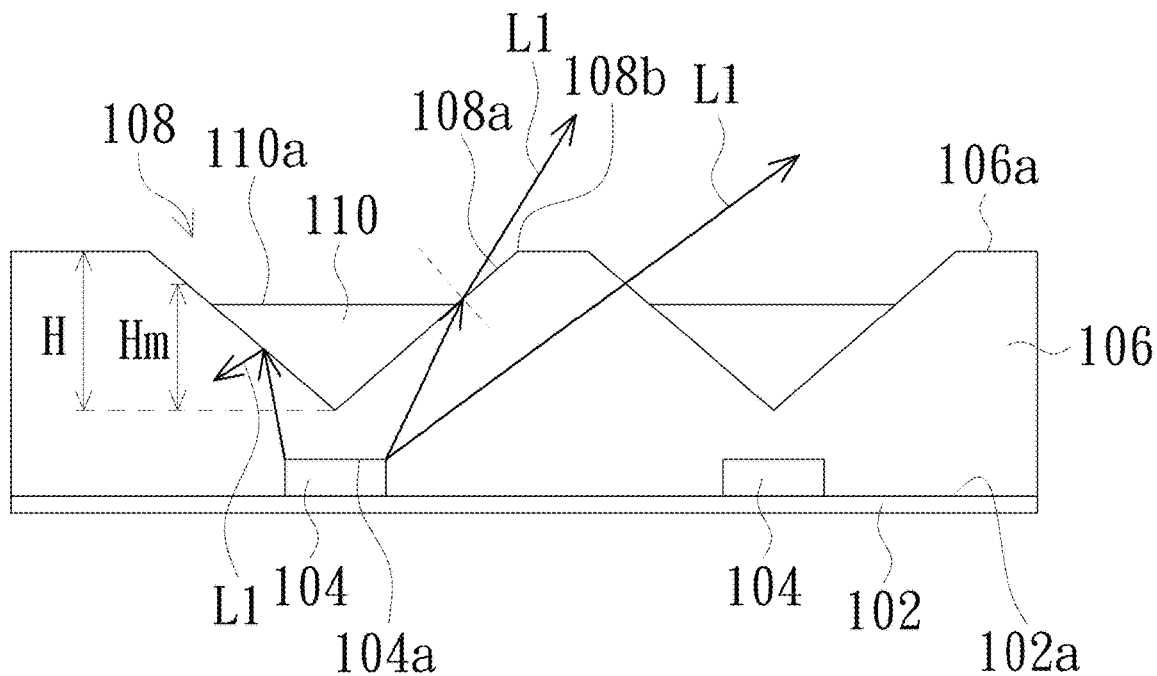
FIG. 2A is a schematic partial enlarged cross-sectional view of a light source module of one embodiment of the invention.

FIG. 2A is a schematic partial enlarged cross-sectional view of a light source module of one embodiment of the invention. Referring to FIG. 2A, in the embodiment, the reflection pattern 110 covers a bottom of the reflecting recess 108 and does not fill the reflecting recess 108. The thickness Hm of the reflection pattern 110 that is a distance between a top surface 110a away from a bottom of the reflecting recess 108 and a bottom of the reflecting recess 108 is smaller than a depth H of the reflecting recess 108. Preferably, a ratio (Hm/H) of the thickness Hm of the reflection pattern 110 to the depth H of the reflecting recess 108 may be between 0.6 and 0.8. In the embodiment, the reflecting recess 108 has an opening 108b on the light exit surface 106a, the light emitting die 104 disposed on the bearing surface 102a of the substrate 102 includes a light emitting surface 104a facing the opening 108b, and the area of the opening 108b is larger than the area of the light emitting surface 104a. A portion of the light L1 emitted from the light emitting die 104 toward the reflecting recess 108 is reflected by the surrounding side surface 108a covered with the reflection pattern 110, and a portion of the light L1 has an opportunity to be refracted above the reflection pattern 110 by the surrounding side surface 108a that is not covered by the reflection pattern 110. In the embodiment, the reflection pattern 110 may include a single layer of a reflective layer. The material of the reflective layer may be white lacquer with diffuse reflection properties or silver lacquer with specular reflection properties. In the embodiment, the bottom of the reflecting recess 108 is a tip that tapers from the surrounding side surface 108a and is disposed substantially opposite to a center of the light emitting die 104. The surrounding side surface 108a is an inclined plane having a single slope, so that a cross-sectional shape of the reflecting recess 108 is close to an isosceles triangle in a cross-sectional view through the center of the corresponding pair of the light emitting die 104 and the reflecting recess 108 and perpendicular to the light exit surface 106a. However, the surrounding side surface 108a may also have a plurality of inclined planes of different slopes or a concave surface or convex surface of different curvatures, or the surrounding side surface 108a can be disposed as a step, so that the cross-sectional shape of the reflecting recess 108 includes a hemispherical, a semi-ellipsoidal, a parabolic or a polygonal.

Figure 2B:
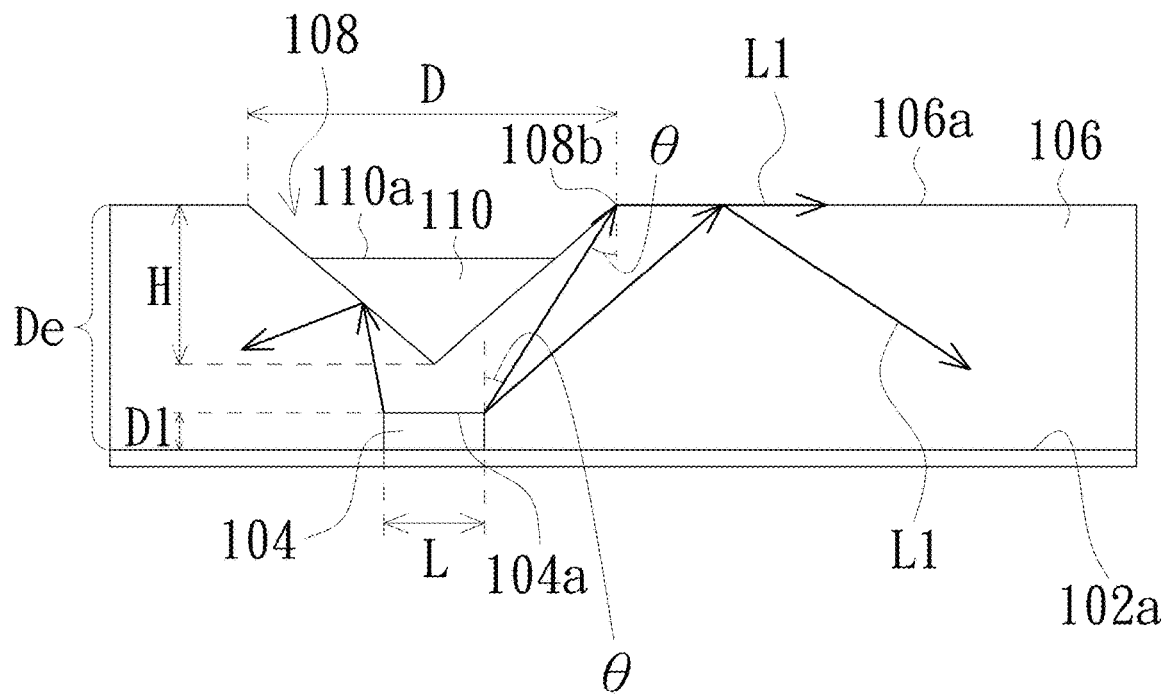
FIG. 2B is a schematic partial enlarged cross-sectional view of a light source module of one embodiment of the invention.

FIG. 2B is a schematic partial enlarged cross-sectional view of a light source module of one embodiment of the invention. Referring to FIG. 2B, in the embodiment, in the cross-sectional view through the center of the corresponding pair of the light emitting die 104 and the reflecting recess 108 and perpendicular to the light exit surface 106a, a distance between two ends of the opening 108b is D, a distance between two ends of the light emitting surface 104a is L, a distance D1 between the light emitting surface 104a and the bearing surface 102a is the thickness of the light emitting die 104, a distance between the bearing surface 102a and the light exit surface 106a is De, a depth of the reflecting recess 108 is H, and H<De−D1, a refractive index of the encapsulation layer 106 is Nm, and a refractive index of an air is Na, a total reflection critical angle of a light L1 emitted from one end of the light emitting surface 104a toward the light exit surface 106a is θ, and θ=$\sin^{-1}$(Na/Nm), the distance D between the two ends of the opening 108b (i.e., the width of the opening 108b) satisfies a relationship: D≥2×[(De−D1)×tan ($\sin^{-1}$(Na/Nm))+L/2]. Thereby, the light L1 that is directly incident on the light exit surface 106a other than the opening 108b of the reflection recess 108 by the light emitting die 104 is totally reflected.

In the light source module 100 of the embodiment, since the light exit surface 106a of the encapsulation layer 106 has a plurality of reflecting recesses 108 and a plurality of reflection patterns 110 respectively disposed in the plurality of reflecting recesses 108, the light L1 having a smaller angle (the light L1 with a small angle between the light and the normal of the bearing surface 102a) emitted by the plurality of light emitting dies 104 disposed relative to the reflecting recess 108 can be reflected by the reflection pattern 110, so as to avoid the problem in the prior art in which the bright spot is still detected above the light emitting die even the optical lens is disposed on the light emitting die.

The width D of the opening 108b of each of the plurality of reflecting recesses 108 of the encapsulation layer 106 of the light source module 100 of the embodiment satisfies the above relationship: D≥2×[(De−D1)×tan ($\sin^{-1}$(Na/Nm))+L/2], so that the light L1 that is directly incident on the light exit surface 106a other than the opening 108b of the reflection recess 108 by the light emitting die 104 is totally reflected back into the encapsulation layer 106, and is sufficiently diffused toward the entire light exit surface 106a by multiple total reflections in the encapsulation layer 106. Therefore, the optical distance OD can be reduced without increasing the quantity of configuration of the light emitting dies 104, and overcome the problem in the prior art in which the diffusion distance of the light of the light emitting die in the backlight chamber is limited.

In the embodiment, the reflection pattern 110 of the light source module 100 does not completely fill the reflecting recess 108. Since the material refractive index of the encapsulation layer 106 is greater than the refractive index of the air, portion of the light L1 of the light emitting die 104 may be refracted above the reflection pattern 110 by the surrounding side surface 108a that is not covered by the reflection pattern 110, and the light provided by the other light emitting dies 104 is also applied above the reflection pattern 110 to compensate the dark area above the reflection pattern 110.

FIG. 3 is a simulation comparison diagram of the light emitting effects of a light source module of the invention and a light source module of the prior art, through which the benefits of the invention is further verified. Referring to FIG. 3, this simulation comparison diagram is obtained by comparing the light source module of the embodiment of FIG. 2A disclosed in the invention with the known light source module in which the light emitting dies are covered by only the encapsulation layer without reflecting recesses. Both use four forward emitting light emitting dies disposed on the surface of a white circuit board with diffuse reflection properties, and a silicone encapsulating resin having a refractive index of 1.41 and a thickness of 1 mm as an encapsulation layer. The column of the Comparison 1 in FIG. 3 shows the light emitting effect above the encapsulation layer. As shown, it is apparent that bright spots of the four light emitting dies of the light source module of the invention are more blurred than that in the prior art. The column of the Comparison 2 in FIG. 3 shows the light emitting effect above the encapsulation layer on which a diffusion plate and two brightness enhancement films are disposed. As shown, the bright spots of the four light emitting dies of the prior art can still be clearly distinguished, but the bright spots of the four light emitting dies of the invention are further blurred.

Figure 4:
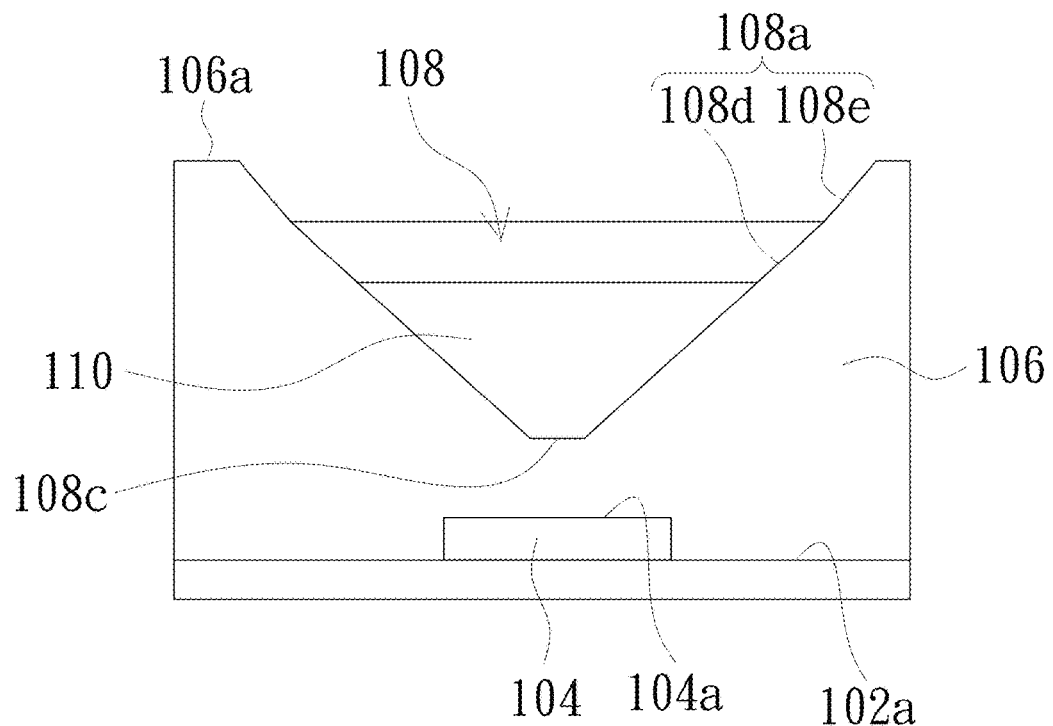
FIG. 4 is a schematic partial enlarged cross-sectional view of a light source module of one embodiment of the invention.

FIG. 4 is a schematic partial enlarged cross-sectional view of a light source module of one embodiment of the invention. Referring to FIG. 4, in the embodiment, the reflecting recess 108 includes a bottom surface 108c, and the bottom of the surrounding side surface 108a is connected to an edge of the bottom surface 108c. The bottom surface 108c can include a curved surface or a plane parallel to the bearing surface 102a. In the cross-sectional view through the center of the corresponding pair of the light emitting die 104 and the reflecting recess 108 and perpendicular to the light exit surface 106a, the projection of the bottom surface 108c along a normal direction of the bearing surface 102a on the light emitting surface 104a of the light emitting die 104 may cover a center of the light emitting die 104. Thus, in the process of forming the reflective recesses 108 of the encapsulation layer 106, the plurality of reflecting recesses 108 can be respectively disposed on the plurality of light emitting dies 104 within an allowable error range, thereby reducing the difficulty to align reflecting recesses 108 to the light emitting dies 104. In the embodiment, in the cross-sectional view through the center of the corresponding pair of the light emitting die 104 and the reflecting recess 108 and perpendicular to the light exit surface 106a, the reflecting recess 108 may have a sectional shape close to a trapezoid. The embodiment is substantially the same as the above embodiment except that the reflecting recess 108 has the bottom surface 108c. In the embodiment, the surrounding side surface 108a includes a first inclined plane 108d and a second inclined plane 108e. The first inclined plane 108d and the second inclined plane 108e have different slopes.

Figure 5:
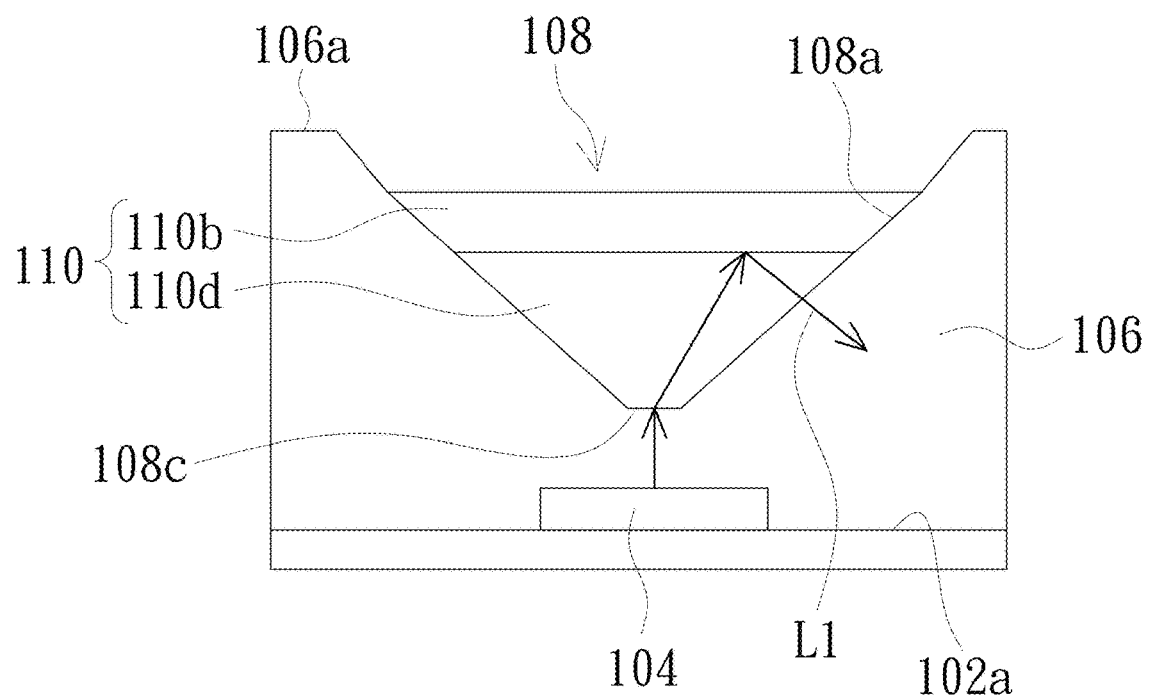
FIG. 5 is a schematic partial enlarged cross-sectional view of a light source module of one embodiment of the invention.

FIG. 5 is a schematic partial enlarged cross-sectional view of a light source module of one embodiment of the invention. Referring to FIG. 5, in the embodiment, the reflection pattern 110 includes a light diffusion layer 110d covering the bottom of the reflecting recess 108 and a reflective layer 110b covering the light diffusion layer 110d, wherein the refractive index of the light diffusion layer 110d is lower than the refractive index of the encapsulation layer 106. In the embodiment, the material of the reflective layer 110b may be a white lacquer having diffuse reflection properties, or a silver lacquer having specular reflection properties. In the embodiment, the bottom of the reflecting recess 108 is the bottom surface 108c, but the reflecting recess 108 whose bottom is a tip that tapers from the surrounding side surface 108a may also have the reflection pattern 110 of the embodiment. Since the refractive index of the light diffusion layer 110d is lower than the refractive index of the encapsulation layer 106, the light L1 emitted from the light emitting dies 104 is deflected when entering from the encapsulation layer 106 into the light diffusion layer 110d, thereby promoting the diffusion of the light L1. The embodiment is substantially the same as the above embodiment except that the reflection pattern 110 includes the light diffusion layer 110d and the reflective layer 110b.

Figure 6:
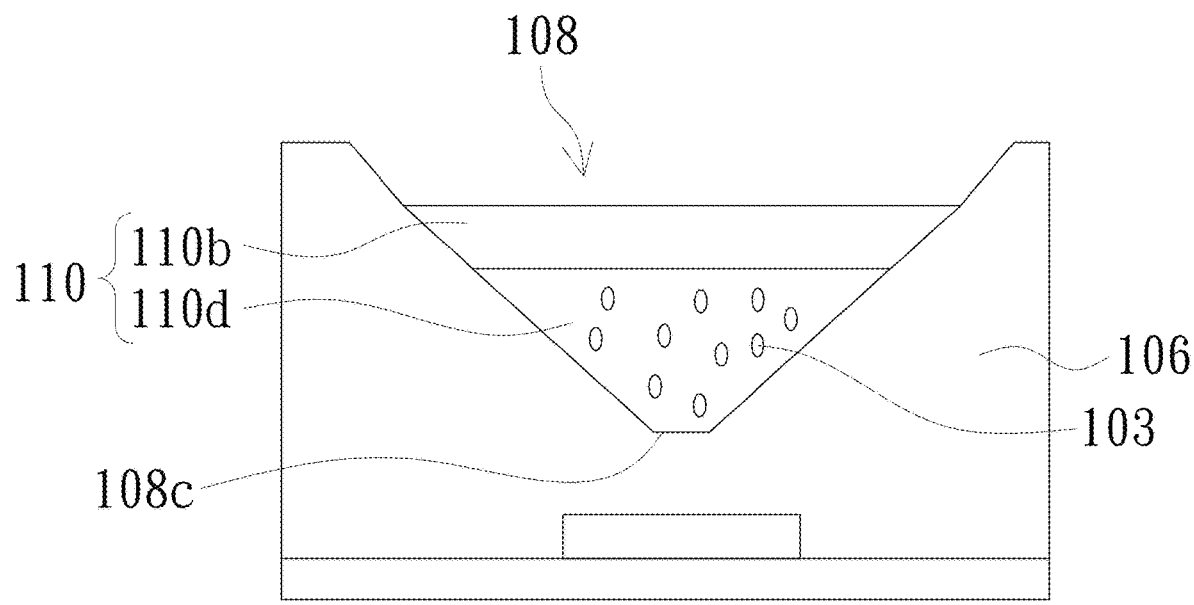
FIG. 6 is a schematic partial enlarged cross-sectional view of a light source module of one embodiment of the invention.

FIG. 6 is a partial enlarged schematic cross-sectional view of a light source module of one embodiment of the invention. Referring to FIG. 1 and FIG. 6, in the embodiment, the reflection pattern 110 includes a light diffusion layer 110d covering the bottom of the reflecting recess 108 and a reflective layer 110b covering the light diffusion layer 110d, wherein the refractive index of the light diffusion layer 110d is lower than the refractive index of the encapsulation layer 106, and the light diffusion layer 110d includes the wavelength conversion material 103. In the embodiment, the material of the reflective layer 110b may be a white lacquer having diffuse reflection properties, or a silver lacquer having specular reflection properties. In the embodiment, the bottom of the reflecting recess 108 is the bottom surface 108c, but the reflecting recess 108 whose bottom is a tip that tapers from the surrounding side surface 108a may also have the reflection pattern 110 of the embodiment. The wavelength conversion material 103 can be a quantum dot or a phosphor. Since the light diffusion layer 110d already includes the wavelength conversion material 103, the optical structure of the light source module 100 shown in FIG. 1 to which the reflection pattern 110 of the embodiment is applied may be disposed only with the diffusion plate 101 and other optical films may be disposed as needed, for example, brightness enhancement film. The embodiment is substantially the same as the above embodiment except that the light diffusion layer 110d includes the wavelength conversion material 103.

Figure 7:
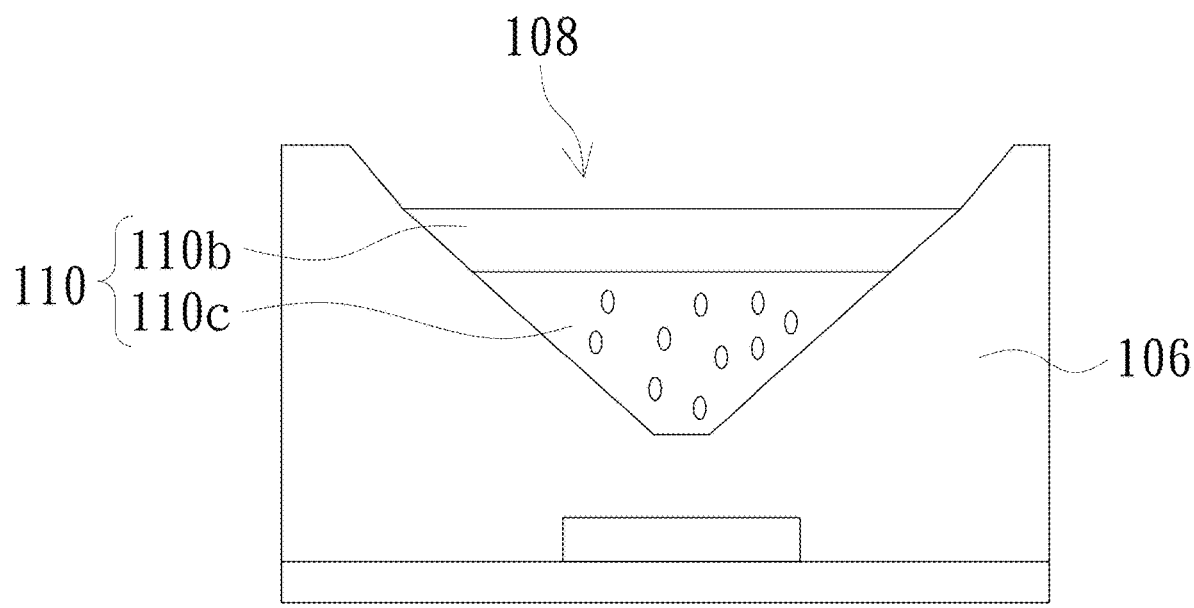
FIG. 7 is a schematic partial enlarged cross-sectional view of a light source module of one embodiment of the invention.

FIG. 7 is a schematic partial enlarged cross-sectional view of a light source module of one embodiment of the invention. Referring to FIG. 1 and FIG. 7, in the embodiment, the reflection pattern 110 includes a wavelength conversion layer 110c covering the bottom of the reflecting recess 108 and a reflective layer 110b covering the wavelength conversion layer 110c. The material of the wavelength conversion layer 110c may include a quantum dot or a phosphor. The embodiment is substantially the same as the embodiment of FIG. 6, except that the wavelength conversion layer 110c may not have a refractive index that lower than the encapsulation layer 106. Since the reflection pattern 110 already includes the wavelength conversion layer 110c, the optical structure of the light source module 100 shown in FIG. 1 to which the reflection pattern 110 of the embodiment is applied may be disposed only with the diffusion plate 101 and other optical films may be disposed as needed, for example, brightness enhancement film.

Figure 8:
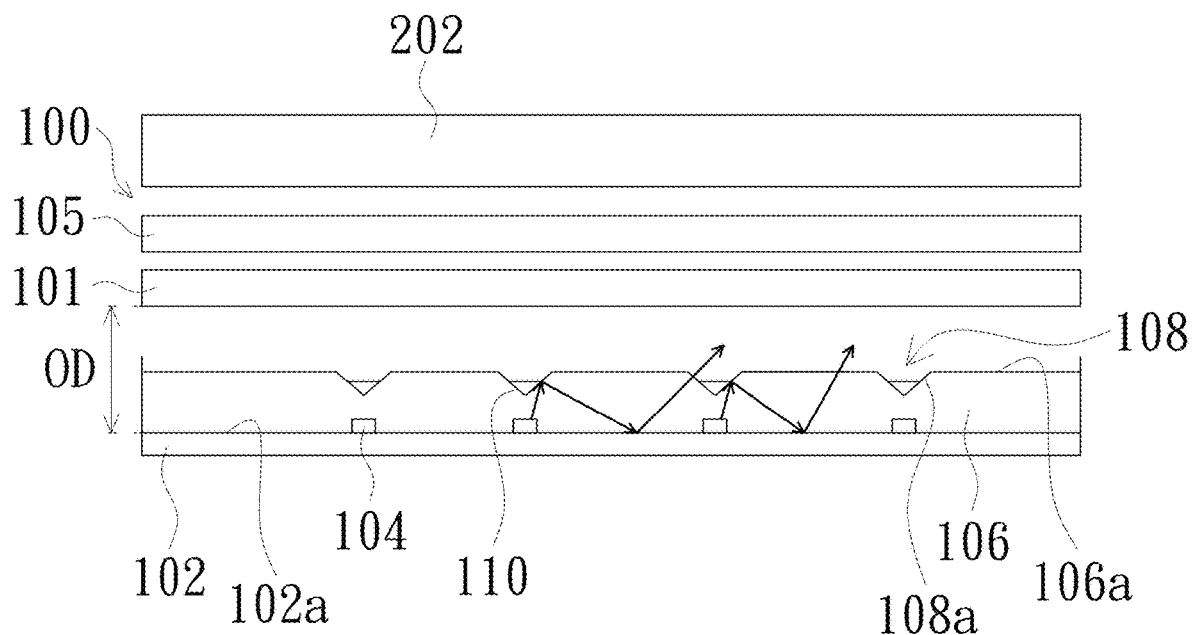
FIG. 8 is a schematic cross-sectional view of a display device of one embodiment of the invention.

FIG. 8 is a schematic cross-sectional view of a display device of one embodiment of the invention. Referring to FIG. 8, a display device 200 of the invention includes a display panel 202 and the light source module of any of the above embodiments. In FIG. 8, the light source module 100 is taken as an example, and the optical structure included in the light source module 100 includes the diffusion plate 101 and the wavelength conversion film 105. However, when the display device of the invention includes the light source module of the different embodiments of the invention, the optical structure may be selectively disposed with the wavelength conversion film 105 or not. For example, when the display device 200 of the invention includes the light source module of the embodiment of FIGS. 4 and 5, the optical structure may include the diffusion plate 101 and the wavelength conversion film 105. On the other hand, when the display device 200 of the invention includes the light source module of the embodiment of FIGS. 6 and 7, the optical structure can omit the wavelength conversion film 105 since the reflecting recess 108 already has a material capable of wavelength conversion.

The display device of the present invention has a light source module capable of providing a uniform light source. Thus, with a control module, the light source module of the embodiment of the invention may further have a local dimming function, so that the display device of the invention becomes a device that can provide high resolution and high contrast.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, comprising:
    a substrate having a bearing surface;
    a plurality of light emitting dies disposed on the bearing surface;
    an encapsulation layer covering the bearing surface and the plurality of light emitting dies, and defining a light exit surface away from the bearing surface;
    a plurality of reflecting recesses formed on the light exit surface and respectively disposed opposite to the plurality of light emitting dies, each of the reflecting recesses having a surrounding side surface inclined relative to the light exit surface; and
    a plurality of reflection patterns respectively disposed in the plurality of reflecting recesses,
    wherein in each of the reflecting recesses, the reflection pattern has a top surface away from a bottom of the reflecting recess, and a distance from the top surface to the bottom of the reflecting recess is smaller than a depth of the reflecting recess.

2. The light source module according to claim 1, wherein each of reflecting recesses has an opening on the light exit surface, the plurality of light emitting dies respectively comprise a light emitting surface facing the opening, and an area of the opening is larger than an area of the light emitting surface.

3. The light source module according to claim 1, wherein each of the reflection patterns comprises a reflective layer covering a bottom of the reflecting recess.

4. The light source module according to claim 1, wherein each of the reflection patterns comprises:
    a wavelength conversion layer, covering a bottom of the reflecting recess; and
    a reflective layer, covering the wavelength conversion layer.

5. The light source module according to claim 1, wherein a ratio of the distance from the top surface to the bottom of the reflecting recess to the depth of the reflecting recess is between 0.6 and 0.8.

6. The light source module according to claim 1, wherein a bottom of the reflecting recess is a tip that tapers from the surrounding side surface.

7. The light source module according to claim 1, wherein the surrounding side surface is an inclined plane having a single slope or an inclined plane comprising a plurality of different slopes.

8. The light source module according to claim 1, wherein in a cross-sectional view through a center of the corresponding pair of the light emitting die and the reflecting recess and perpendicular to the light exit surface, a cross-sectional shape of the reflecting recess comprises an isosceles triangle, a hemispherical, a semi-ellipsoidal, a parabolic, trapezoidal or a polygon.

9. The light source module according to claim 1, wherein the surrounding side surface is a concave surface or a convex surface having a single curvature, or the surrounding side surface comprises a plurality of concave surfaces or convex surfaces of different curvatures.

10. The light source module according to claim 1, wherein the surrounding side surface has a stepped structure.

11. The light source module according to claim 1, wherein the bearing surface is a reflecting surface.

12. The light source module according to claim 1, wherein the light exit surface of the encapsulation layer comprises at least one of a plurality of concave portions and and/or a plurality of convex portions, or is configured as a roughened surface.

13. The light source module according to claim 1, wherein each of the reflection patterns comprises:

a light diffusion layer, covering a bottom of the reflecting recess, wherein a refractive index of the light diffusion layer is lower than a refractive index of the encapsulation layer; and a reflective layer, covering the light diffusion layer.

14. The light source module according to claim 13, wherein the light diffusion layer comprises a wavelength conversion material.

15. The light source module according to claim 1, wherein each of the reflecting recesses comprises a bottom surface, and a bottom of the surrounding side surface is connected to an edge of the bottom surface.

16. The light source module according to claim 15, wherein the bottom surface comprises a curved surface or a plane parallel to the bearing surface.

17. A display device, comprising:
a light source module including:
a substrate having a bearing surface;
a plurality of light emitting dies disposed on the bearing surface;
an encapsulation layer covering the bearing surface and the plurality of light emitting dies, and defining a light exit surface away from the bearing surface;
a plurality of reflecting recesses formed on the light emitting surface and respectively disposed opposite to the plurality of light emitting dies, each of the reflecting recesses having a surrounding side surface inclined relative to the light exit surface; and
a plurality of reflection patterns respectively disposed in the plurality of reflecting recesses; and
a display panel disposed adjacent to the light emitting surface;
wherein in each of the reflecting recesses, the reflection pattern has a top surface away from a bottom of the reflecting recess, and a distance from the top surface to the bottom of the reflecting recess is smaller than a depth of the reflecting recess.

18. A light source module, comprising:
a substrate, having a bearing surface;
a plurality of light emitting dies, disposed on the bearing surface;
an encapsulation layer covering the bearing surface and the plurality of light emitting dies, and defining a light exit surface away from the bearing surface;
a plurality of reflecting recesses formed on the light emitting surface and respectively disposed opposite to the plurality of light emitting dies, each of the reflecting recesses having a surrounding side surface inclined relative to the light exit surface;
a plurality of reflection patterns respectively disposed in the plurality of reflecting recesses;
a diffusion plate, disposed above the encapsulation layer; and
a wavelength conversion film, disposed between the encapsulation layer and the diffusion plate or disposed above the diffusion plate.

19. A light source module, comprising:
a substrate, having a bearing surface;
a plurality of light emitting dies, disposed on the bearing surface;
an encapsulation layer covering the bearing surface and the plurality of light emitting dies, and defining a light exit surface away from the bearing surface;
a plurality of reflecting recesses formed on the light emitting surface and respectively disposed opposite to the plurality of light emitting dies, each of the reflecting recesses having a surrounding side surface inclined relative to the light exit surface; and
a plurality of reflection patterns respectively disposed in the plurality of reflecting recesses;
wherein the substrate comprises a transparent plate and a bottom reflective layer, the transparent plate has the bearing surface, the bottom reflective layer is disposed on a base bottom surface of the transparent plate opposite to the bearing surface, and a partial region of the bearing surface is disposed with a plurality of conductive patterns to electrically connect the light emitting dies.

20. A light source module, comprising:
a substrate, having a bearing surface;
a plurality of light emitting dies disposed on the bearing surface;
an encapsulation layer covering the bearing surface and the plurality of light emitting dies, and defining a light exit surface away from the bearing surface;
a plurality of reflecting recesses formed on the light exit surface and respectively disposed opposite to the plurality of light emitting dies, each of the reflecting recesses having a surrounding side surface inclined relative to the light exit surface; and
a plurality of reflection patterns respectively disposed in the plurality of reflecting recesses,
wherein each of reflecting recesses has an opening on the light exit surface and bottom surface opposite the opening, each of the light emitting dies respectively comprises a light emitting surface facing the bottom surface, an area of the opening is larger than an area of the light emitting surface, and the area of the light emitting surface is larger than an area of the bottom surface.

21. A light source module, comprising:
a substrate, having a bearing surface;
a plurality of light emitting dies disposed on the bearing surface and having a light emitting surface;
an encapsulation layer covering the bearing surface and the plurality of light emitting dies, and defining a light exit surface away from the bearing surface;
a plurality of reflecting recesses formed on the light exit surface and respectively disposed opposite to the plurality of light emitting dies, each of the reflecting recesses having a surrounding side surface inclined relative to the light exit surface and defining an opening on the light exit surface; and
a plurality of reflection patterns respectively disposed in the plurality of reflecting recesses,
wherein in a cross-sectional view through a center of the corresponding pair of the light emitting die and the reflecting recess and perpendicular to the light exit surface, a distance between two ends of the opening is D, a distance between two ends of the light emitting surface is L, a distance between the light emitting surface and the bearing surface is D1, a distance between the bearing surface and the light exit surface is De, a depth of the reflecting recess is H, and H<De−D1, a refractive index of the encapsulation layer is Nm, a refractive index of an air is Na, a total reflection critical angle of a light emitted from one end of the light emitting surface toward the light exit surface is θ, and θ=sin$^{-1}$(Na/Nm), the distance D between the two ends of the opening satisfies a relationship: D≥2×[(De−D1)× tan(sin$^{-1}$(Na/Nm))+L/2].

* * * * *